(12) United States Patent
Connell, II et al.

(10) Patent No.: US 10,169,319 B2
(45) Date of Patent: Jan. 1, 2019

(54) SYSTEM, METHOD AND COMPUTER PROGRAM PRODUCT FOR IMPROVING DIALOG SERVICE QUALITY VIA USER FEEDBACK

(71) Applicant: International Business Machines Corporation, Armonk, NY (US)

(72) Inventors: Jonathan Hudson Connell, II, Cortlandt-Manor, NY (US); Mishal Dholakia, Danbury, CT (US); Shang Qing Guo, Cortlandt manor, NY (US); Jonathan Lenchner, North Salem, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/277,886

(22) Filed: Sep. 27, 2016

(65) Prior Publication Data
US 2018/0090136 A1    Mar. 29, 2018

(51) Int. Cl.
*G10L 15/04* (2013.01)
*G06F 17/27* (2006.01)

(52) U.S. Cl.
CPC .................................. *G06F 17/27* (2013.01)

(58) Field of Classification Search
CPC ......... G06F 17/30657; G06F 17/30371; G10L 15/22; G10L 15/08

USPC ..................... 704/1–10, 230–270.1
See application file for complete search history.

(56) References Cited

U.S. PATENT DOCUMENTS

| | | | |
|---|---|---|---|
| 2006/0200347 A1* | 9/2006 | Kim ..................... | G10L 15/22 704/236 |
| 2009/0259466 A1* | 10/2009 | Stubley ................. | G10L 15/08 704/240 |
| 2014/0101119 A1* | 4/2014 | Li ......................... | G06F 17/30657 707/706 |
| 2017/0046435 A1* | 2/2017 | Salvetti ............... | G06F 17/30371 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Huyen Vo
(74) *Attorney, Agent, or Firm* — JoAnn Kealy Crockatt, Esq.; McGinn IP Law Group, PLLC

(57) ABSTRACT

A dialog performance improvement method, system, and computer program product, include, computing a plurality of question classes and a confidence score for each of the question classes for a language input of a user, comparing the confidence score to an upper threshold and a lower threshold for each of the question classes to determine which of at least one action to perform, receiving a language feedback from the user for the performed action, and adjusting at least one of the upper threshold and the lower threshold based on the language feedback from the user.

20 Claims, 5 Drawing Sheets

SYSTEM, METHOD AND COMPUTER PROGRAM PRODUCT FOR IMPROVING DIALOG SERVICE QUALITY VIA USER FEEDBACK

BACKGROUND

The present invention relates generally to a dialog performance improvement method, and more particularly, but not by way of limitation, to a system, method, and computer program product for improving dialog quality through self-learning from user feedback.

Many virtual agents, bots and full-fledged robots employ spoken dialog to try to provide enhanced human-machine interaction. The dialog service quality heavily depends on voice recognition, and a classification model. However, quality is often poor.

Some conventional techniques have considered dynamic user feedback in a guide that is presented to the user. The feedback presented in the guide enables the user to refine the classification model by adding or removing exemplars, creating, editing or deleting rules, or performing other such adjustments to the classification model. However, the conventional techniques require extensive user re-programming of the dialog system in order to improve the dialog performance.

SUMMARY

In an exemplary embodiment, the present invention can provide a computer-implemented dialog performance improvement method, the method including receiving a language input from a user, computing a plurality of question classes and a confidence score for each of the question classes for the language input, comparing the confidence score to an upper threshold and a lower threshold for each of the question classes to determine which of one or more actions to perform, receiving a language feedback from the user for the performed action, and adjusting at least one of the upper threshold and the lower threshold based on the language feedback from the user.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
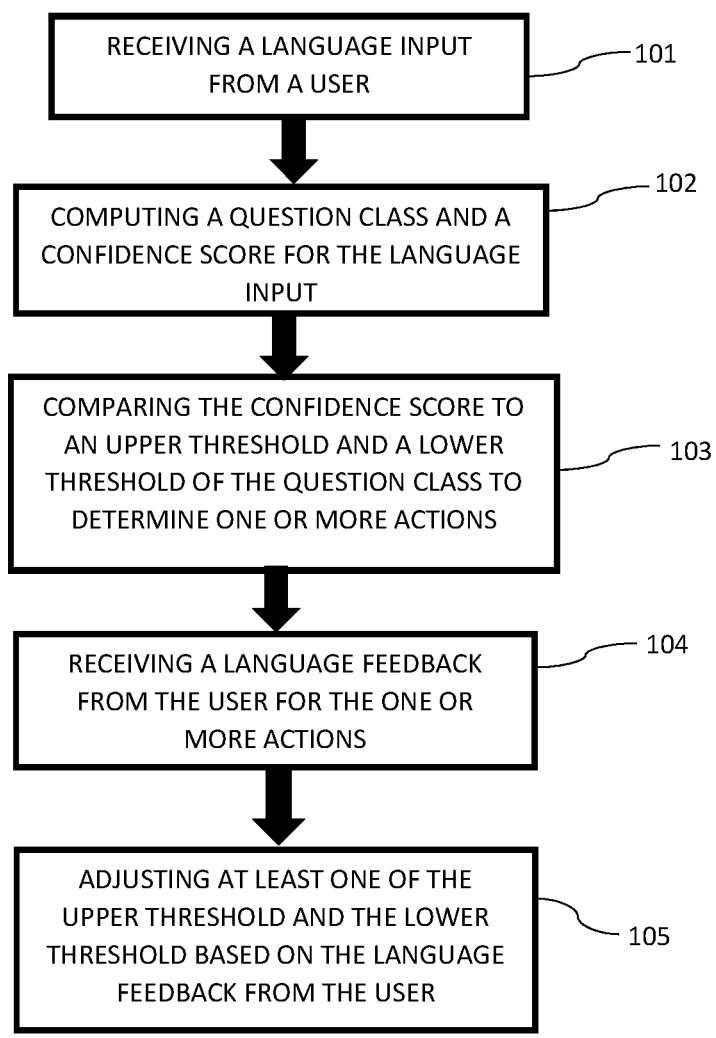
FIG. 1 exemplarily shows a high-level flow chart for a dialog performance improvement method 100.

The invention will now be described with reference to FIG. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the dialog performance improvement method 100 includes various steps to provide a self-learning module on top of a natural language classifier which collects explicit and implicit user feedback from a conversation and feeds it back to the classifier to improve dialog quality. As shown in at least FIG. 4, one or more computers of a computer system 12 according to an embodiment of the present invention can include a memory 28 having instructions stored in a storage system to perform the steps of FIG. 1.

Thus, the dialog performance improvement method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 3-5) may be implemented in a cloud environment 50 (see e.g., FIG. 4), it is nonetheless understood that the present invention can be implemented outside of the cloud environment.

In step 101, a language input is received from a user (e.g., a question, utterance, etc.).

In step 102, a question class and a confidence score of the question class are computed for the language input from step 101. That is, the language input is classified into a plurality of question classes and a confidence score that the language input corresponds to each of the question classes. In other words, the language input can include utterances as the language input and a set of classes with their confidences is computed. Each class corresponds to a set of questions (or utterances) that essentially ask (or say) the same (or substantially similar) things. For example, a question class can include "bathroom location" and the utterances of the question class can include, for example, "where is the bathroom", "is there a restroom", "how do I get to the restroom", etc. Each of the utterances is given a confidence score that the utterance corresponds to a question class. That is, "how do I get to the restroom" could potentially correspond with a ninety-percent confidence to "bathroom location" question class but can also correspond with sixty-percent confidence to a "direction query" question class.

In step 103, the confidence score is compared to an upper threshold and a lower threshold for each of the question classes to determine one or more actions to take based on the comparison to the upper threshold and the lower threshold. For example, a first action may be taken if the confidence score is above the upper threshold, a second action may be taken if the confidence score is below the upper threshold but above the lower threshold, and a third action may be taken if the confidence score is below the lower threshold. It is noted that the upper threshold is a greater threshold than the lower threshold.

In step 103, the actions include answering the language input if the score is above the upper threshold, paraphrasing the question back to the user to confirm the question class (i.e., "did you mean . . . ") if the score is between the upper and lower thresholds, and ignoring the question if the score is below the lower threshold (e.g., not providing a response to the user).

In step 104, a language feedback from the user is received for the one or more actions. The language feedback can include a positive feedback (e.g., the answer is correct), a negative feedback (e.g., the answer is incorrect, the question class is incorrect, etc.), or an extended interval with no input.

In step 105, at least one of the upper threshold and the lower threshold is adjusted based on the language feedback from the user in step 104.

For example, in step 105, if the confidence score was above the upper threshold and the robot answered the user, the upper threshold is increased if the user provides negative feedback. Alternatively, the upper threshold is decreased if the user provides no feedback (answer assumed correct) or positive feedback. That is, the upper and lower thresholds are changed by adding a small positive or negative delta. This changes the threshold tendency and eventually converges to the optimal one.

In some embodiments, in step 105, if the confidence score is between the upper and lower thresholds and the robot asks "Did you mean?", the lower threshold is decreased if the user response is "yes" and increased if the user response is "no".

In some embodiments, if the confidence score is below the lower threshold and the robot ignores the question, the transcribed utterance goes into database for subsequent review by a system administrator or programmer.

In some embodiments, a class for a non-recognized question can be found via rephrasing of the question. For example, "I need to powder my nose" can be the language input which is a non-recognized question. The robot can then answer "can you rephrase the question?" in which the language input is given again as "where is the bathroom" which indicates a question class of "bathroom location". Based on the rephrased language input, the robot can answer "the bathroom is in aisle 13". As a result of the paraphrased language input triggering a known question class with a confidence score, the non-recognized question can be added to the question class "bathroom location" for subsequent queries/future answers.

In another embodiment, the robot can be taught an answer to an existing question class and answer class for the question class. For example, the language input can be a non-recognized question of "I need to wash my hands". Even if the question class can be computed, the answer may be unknown to the question class. The robot can take one of a plurality of actions including responding by saying "Sorry, I don't know the answer. If you know the answer to the question you just asked, please suggest how I can answer it the next time by saying the words 'the answer is' followed by your suggested answer." As a user feedback to this, the user can respond with a language input of "the answer is the bathroom is in aisle 13" in which the question class "bathroom location" is returned to the database for future answers. In other words, because the question cannot be recognized (e.g., the confidence of the top class is too low), the user can provide the answer to that question. Then, the question/answer can be paired for future uses.

That is, the scope of a classifier-based dialog can be increased in some embodiments by receiving a first language input from a user, computing a first question class and confidence score by the classifier, generating a language prompt to the user when the score is below a threshold, receiving a second language input from a user, and adding the first language input to a second question class based on the second language input. In some embodiments, the generating a language prompt can include asking for a rephrasing of the first question. In other embodiments, choosing the second question class include setting it to a question class computed for the second user input.

Other embodiments to increase the scope of a classifier-based dialog can include generating a language prompt by asking for confirmation of the first question class. Also, choosing the second question class can include copying the first question class when the second user input is affirmative. Alternatively, the generating a language prompt can include soliciting an appropriate response for the first language input and choosing the second question class can include computing an answer class for the second user input and selecting the question class associated with the computed answer class.

Figure 2:
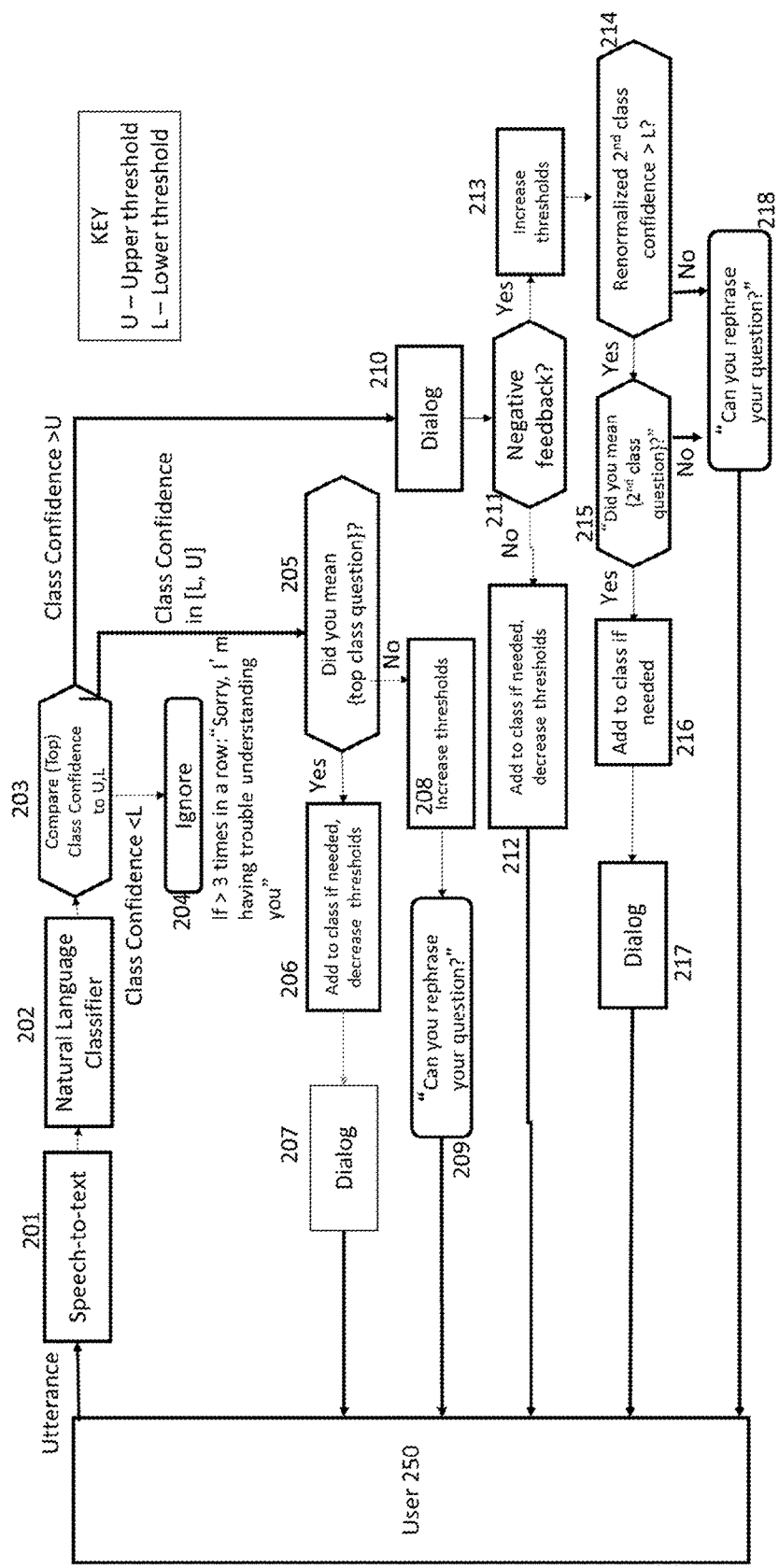
FIG. 2 exemplarily depicts one embodiment of the dialog performance improvement method 100.

Referring now to FIG. 2, an exemplarily embodiment of the method 100 is depicted. The user 250 says an utterance which is converted from speech-to-text in 201 and run through a natural language classifier in 202. The top (e.g., highest) confidence score of the question classes is compared to an upper threshold (U) and a lower threshold (L) in 203. If the class confidence is less than the lower threshold, the question is ignored or no answer is given in 204. That is, the user is not given answers if the confidence score is below the lower threshold which may waste the user's time or provide the user with wrong answers. If three utterances in a row are below the lower threshold (L), the robot can respond "I am having trouble understanding you" such that the user can potentially adjust their line of questioning. If the confidence score of the top question class is between the upper threshold (U) and the lower threshold (L), the robot can ask the user if they meant the question class in 205. If the user responds that they did intend for the question to be of the classified question class, the upper threshold is decreased for that question class such. The answer to the question is output to the user in 207. If the user did not intend the paraphrased question class, then the upper threshold and lower threshold are increased to potentially avoid that question class falling within the thresholds in 208 and the user is then asked to rephrase the question in 209. If the confidence score for the question class is above the upper threshold (U), an answer is given in 210 in which the user can provide feedback in 211 to the answer. If the feedback is not negative, the upper and lower thresholds are decreased. If the feedback is negative that the answer was incorrect, the thresholds are increased in 213 and the second top class (e.g., the question class with the second highest confidence score is analyzed if it is greater than the lower threshold in 214. If yes, then in 215, the robot queries the user the question class to determine if the user intended that question class. If yes, the question class is added in step 216 to correspond to the utterance and an answer is given in 217. If no, in 218, the robot asks to rephrase the utterance in which the flow starts over at 201.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
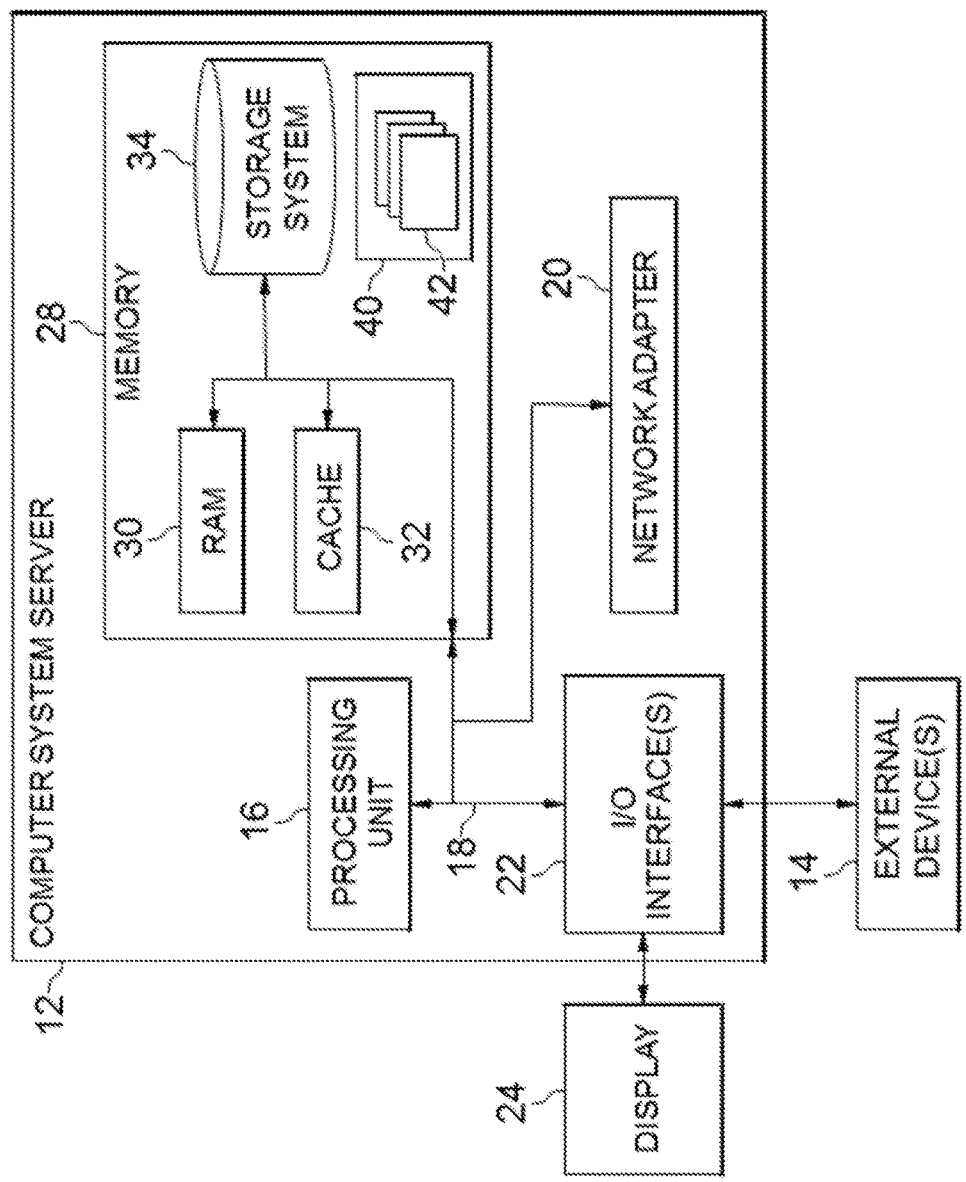
FIG. 3 depicts a cloud computing node 10 according to an embodiment of the present invention.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 3, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
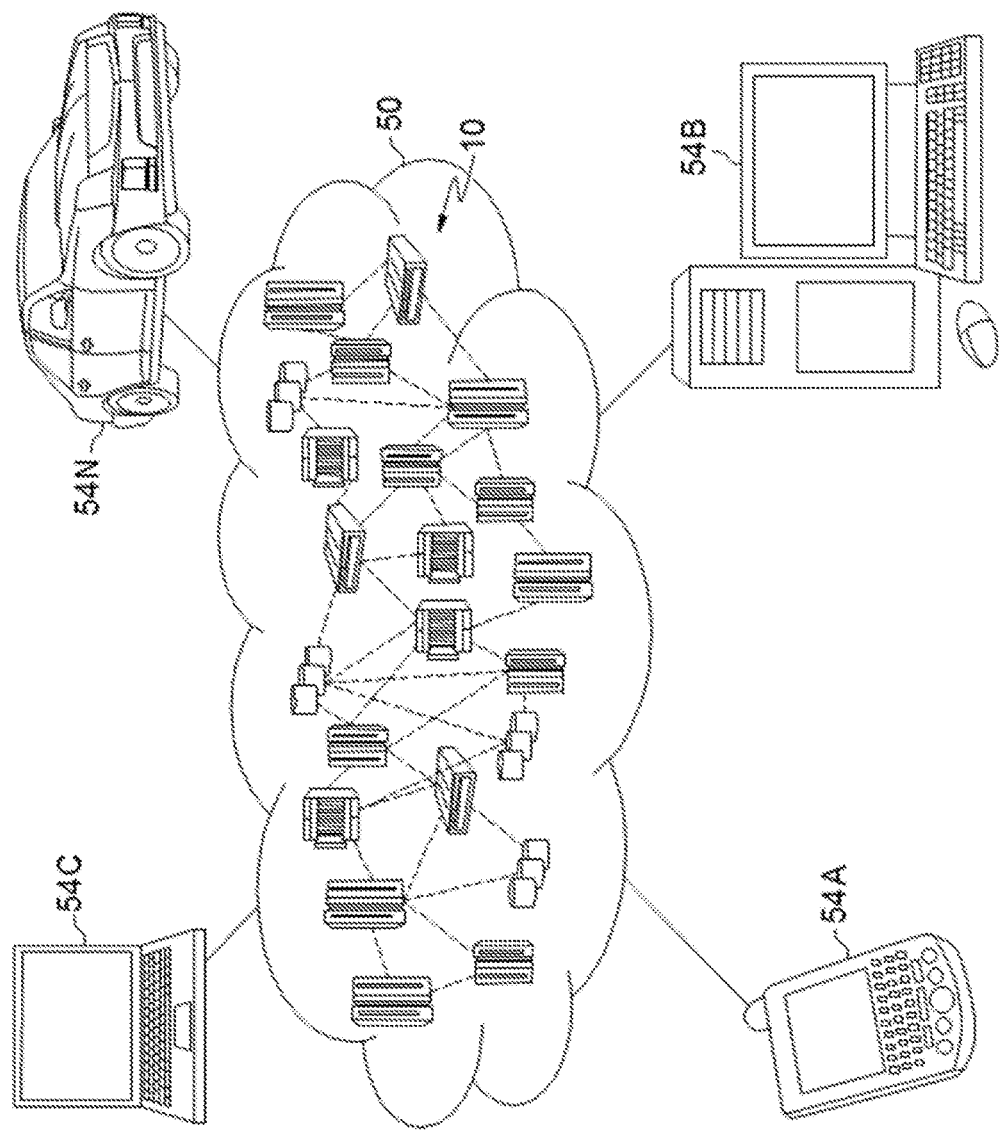
FIG. 4 depicts a cloud computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
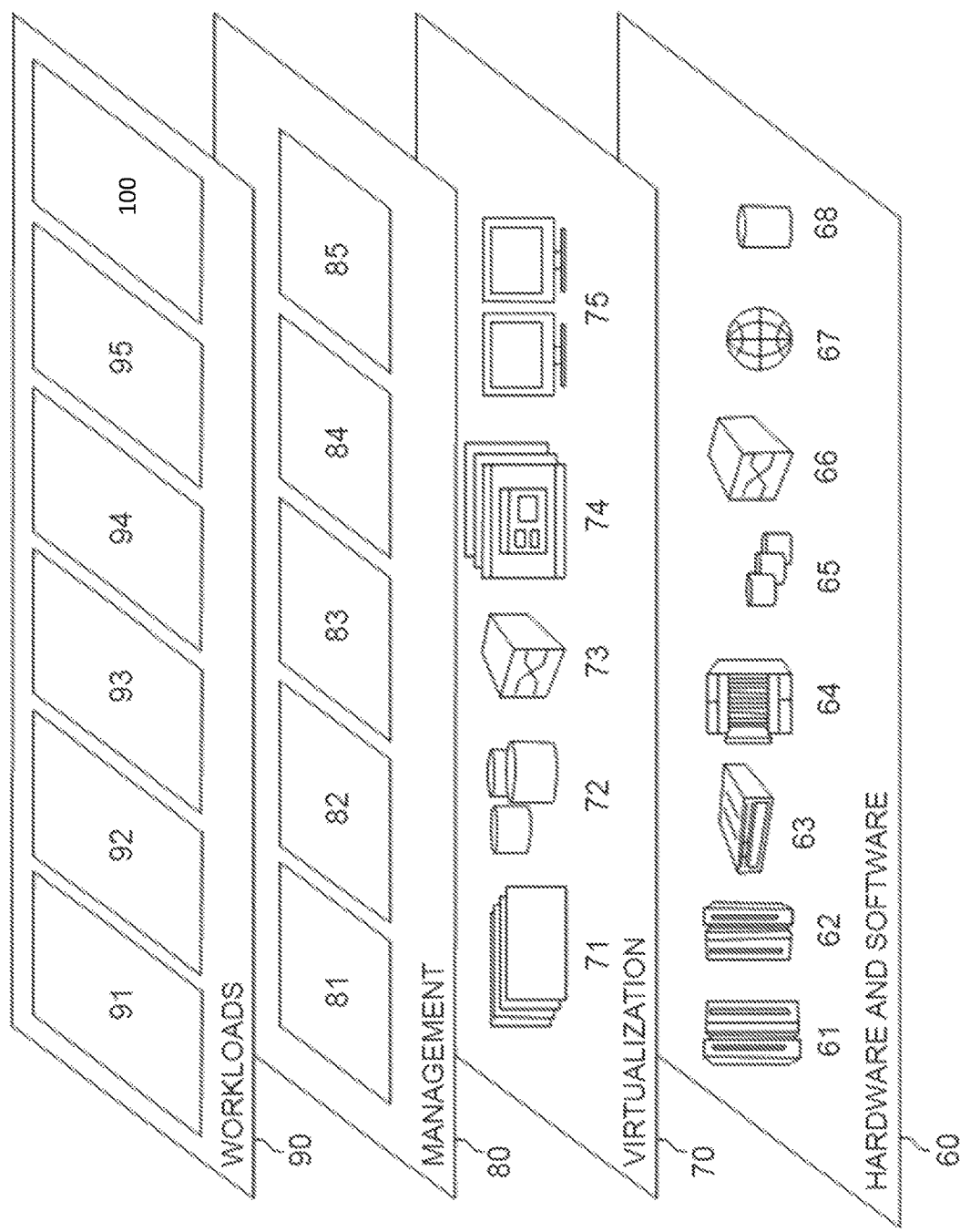
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the dialog performance improvement method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented dialog performance improvement method, the method comprising:
    computing a plurality of question classes and a confidence score for each of the question classes for a language input of a user;
    comparing the confidence score to an upper threshold and a lower threshold for each of the question classes to determine which of at least one action to perform;
    receiving a language feedback from the user for the performed action; and
    adjusting at least one of the upper threshold and the lower threshold based on the language feedback from the user,
    wherein the at least one action to perform includes a different action based on the confidence score being above, below, or in between the upper threshold and the lower threshold,
    wherein, if the confidence score is between the upper threshold and the lower threshold, querying the user for a second language feedback, and decreasing the upper threshold to produce an updated upper threshold if the second language feedback includes a positive feedback or increasing the lower threshold to produce an updated lower threshold if the second language feedback includes a negative feedback, thereby to refine a distance between the upper threshold and the lower threshold in order to increase an accuracy of an answer to the plurality of question classes, and
    wherein a confidence score of a next language input of the user is compared with the updated upper threshold or the updated lower threshold to determine which of the at least one action to perform.

2. The computer-implemented method of claim 1, wherein the language feedback comprises one of:
    the positive feedback;
    the negative feedback; and
    an extended interval with no input.

3. A computer-implemented method of claim 1, wherein the at least one action comprises:
    answering the language input if the confidence score is above the upper threshold;
    paraphrasing the language input to respond with the paraphrased language input back to the user to confirm an intention of the language input if the confidence score is between the upper threshold and the lower threshold; and
    ignoring the question class if the confidence score of the question class is below the lower threshold.

4. The computer-implemented method of claim 3, wherein the at least one action further comprises providing an answer for the question class if the initial action was the paraphrasing and a positive feedback is given to the paraphrased language input.

5. The computer-implemented method of claim 4, wherein the upper threshold is increased when the confidence score is above the upper threshold and a negative feedback is received in response to the answer, and
    wherein the upper threshold is decreased when the confidence score is above the upper threshold and a positive feedback or no feedback is received.

6. The computer-implemented method of claim 5, wherein the lower threshold is increased when the confidence score is between the upper threshold and the lower threshold and a negative feedback is received, and
    wherein the lower threshold is decreased when the confidence score is between the upper threshold and the lower threshold and a positive feedback is received.

7. The computer-implemented method of claim 4, wherein the lower threshold is increased when the confidence score is between the upper threshold and the lower threshold and a negative feedback is received, and
    wherein the lower threshold is decreased when the confidence score is between the upper threshold and the lower threshold and a positive feedback is received.

8. The computer-implemented method of claim 1, embodied in a cloud-computing environment.

9. A non-transitory computer program product for dialog performance improvement, the computer program product comprising a non-transitory computer-readable storage medium having program instructions embodied therewith, the program instructions executable by a computer to cause the computer to perform:
    computing a plurality of question classes and a confidence score for each of the question classes for a language input of a user;
    comparing the confidence score to an upper threshold and a lower threshold for each of the question classes to determine which of at least one action to perform;
    receiving a language feedback from the user for the performed action; and
    adjusting at least one of the upper threshold and the lower threshold based on the language feedback from the user,
    wherein the at least one action to perform includes a different action based on the confidence score being above, below, or in between the upper threshold and the lower threshold,
    wherein, if the confidence score is between the upper threshold and the lower threshold, querying the user for a second language feedback, and decreasing the upper threshold to produce an updated upper threshold if the second language feedback includes a positive feedback or increasing the lower threshold to produce an updated lower threshold if the second language feedback includes a negative feedback, thereby to refine a distance between the upper threshold and the lower threshold in order to increase an accuracy of an answer to the plurality of question classes, and wherein a confidence score of next language input of the user is compared with the updated upper threshold or the updated lower threshold to determine which of the at least one action to perform.

10. The non-transitory computer program product of claim 9, wherein the language feedback comprises one of:
the positive feedback;
the negative feedback; and
an extended interval with no input.

11. The non-transitory computer program product of claim 9, wherein the at least one action comprises:
answering the language input if the confidence score is above the upper threshold;
paraphrasing the language input to respond with the paraphrased language input back to the user to confirm an intention of the language input if the confidence score is between the upper threshold and the lower threshold; and
ignoring the question class if the confidence score of the question class is below the lower threshold.

12. The non-transitory computer program product of claim 11, wherein the at least one action further comprises providing an answer for the question class if the initial action was the paraphrasing and a positive feedback is given to the paraphrased language input.

13. The non-transitory computer program product of claim 12, wherein the upper threshold is increased when the confidence score is above the upper threshold and a negative feedback is received in response to the answer, and
wherein the upper threshold is decreased when the confidence score is above the upper threshold and a positive feedback or no feedback is received.

14. The non-transitory computer program product of claim 12, wherein the lower threshold is increased when the confidence score is between the upper threshold and the lower threshold and a negative feedback is received, and
wherein the lower threshold is decreased when the confidence score is between the upper threshold and the lower threshold and a positive feedback is received.

15. The non-transitory computer program product of claim 13, wherein the lower threshold is increased when the confidence score is between the upper threshold and the lower threshold and a negative feedback is received, and
wherein the lower threshold is decreased when the confidence score is between the upper threshold and the lower threshold and a positive feedback is received.

16. A dialog performance improvement system, said system comprising:
a processor; and
a memory, the memory storing instructions to cause the processor to perform:
computing a plurality of question classes and a confidence score for each of the question classes for a language input of a user;
comparing the confidence score to an upper threshold and a lower threshold for each of the question classes to determine which of at least one action to perform;
receiving a language feedback from the user for the performed action; and
adjusting at least one of the upper threshold and the lower threshold based on the language feedback from the user,
wherein the at least one action to perform includes a different action based on the confidence score being above, below, or in between the upper threshold and the lower threshold,
wherein, if the confidence score is between the upper threshold and the lower threshold, querying the user for a second language feedback, and decreasing the upper threshold to produce an updated upper threshold if the second language feedback includes a positive feedback or increasing the lower threshold to produce an updated lower threshold if the second language feedback includes a negative feedback, thereby to refine a distance between the upper threshold and the lower threshold in order to increase an accuracy of an answer to the plurality of question classes, and
wherein a confidence score of a next language input of the user is compared with the updated upper threshold or the updated lower threshold to determine which of the at least one action to perform.

17. The system of claim 16, wherein the language feedback comprises one of:
the positive feedback;
the negative feedback; and
an extended interval with no input.

18. The system of claim 16, wherein the at least one action comprises:
answering the language input if the confidence score is above the upper threshold;
paraphrasing the language input to respond with the paraphrased language input back to the user to confirm an intention of the language input if the confidence score is between the upper threshold and the lower threshold; and
ignoring the question class if the confidence score of the question class is below the lower threshold.

19. The system of claim 18, wherein the at least one action further comprises providing an answer for the question class if the initial action was the paraphrasing and a positive feedback is given to the paraphrased language input.

20. The system of claim 14, embodied in a cloud-computing environment.

* * * * *